(12) United States Patent
Purdy et al.

(10) Patent No.: US 6,197,447 B1
(45) Date of Patent: Mar. 6, 2001

(54) BATTERY CONTAINER

(75) Inventors: Geoffrey William Purdy; Mark Downing, both of Greater Manchester (GB)

(73) Assignee: Oldham Crompton Batteries Limited, London (GB)

( * ) Notice: Subject to any disclaimer, the term of this patent is extended or adjusted under 35 U.S.C. 154(b) by 0 days.

(21) Appl. No.: 09/275,299

(22) Filed: Mar. 24, 1999

(30) Foreign Application Priority Data

Apr. 2, 1998 (GB) .................................... 9807022

(51) Int. Cl.[7] .................................................. H01M 2/02
(52) U.S. Cl. ............................ 429/175; 429/87; 429/176
(58) Field of Search ................. 429/175, 87, 84, 429/176

(56) References Cited

FOREIGN PATENT DOCUMENTS

| 1537818 | 1/1979 | (GB) | ............................. H01M/2/10 |
| 2061599 | 5/1981 | (GB) | ............................. H01M/2/02 |
| 2077027 | 12/1981 | (GB) | ............................. H01M/2/12 |
| 2081495 | 2/1982 | (GB) | ............................. H01M/2/12 |

*Primary Examiner*—John S. Maples
(74) *Attorney, Agent, or Firm*—Myers Bigel Sibley & Sajovec

(57) ABSTRACT

A battery container comprising a box with a lid. Ventilation openings are provided in the sides of the box. Part of the sides in which ventilation openings are provided may be attached to the lid. Apertures having drainage channels beneath are provided in the lid. The openings and apertures provide sufficient ventilation to meet the relevant regulations. The provision of apertures in the lid allows the overall height of the container to be reduced.

21 Claims, 4 Drawing Sheets

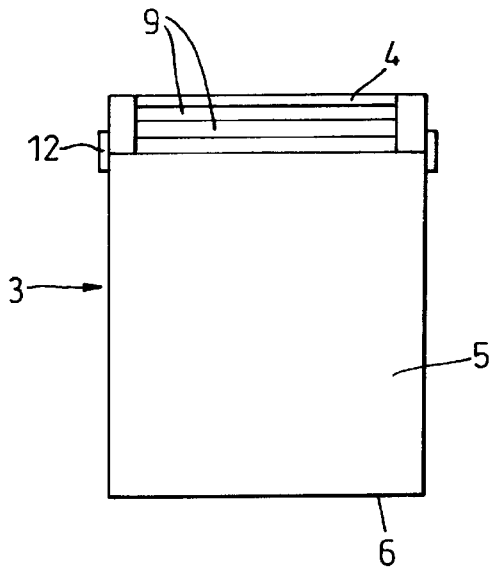
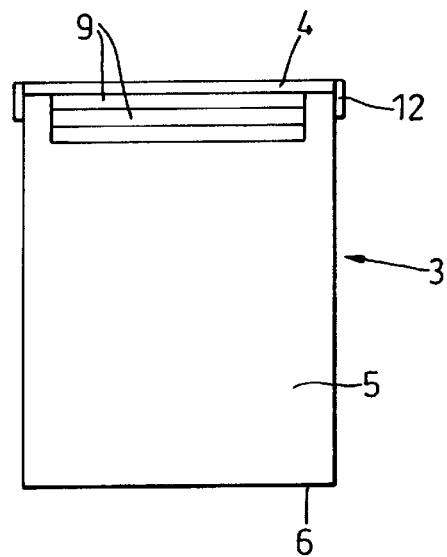
Fig. 4          Fig. 5
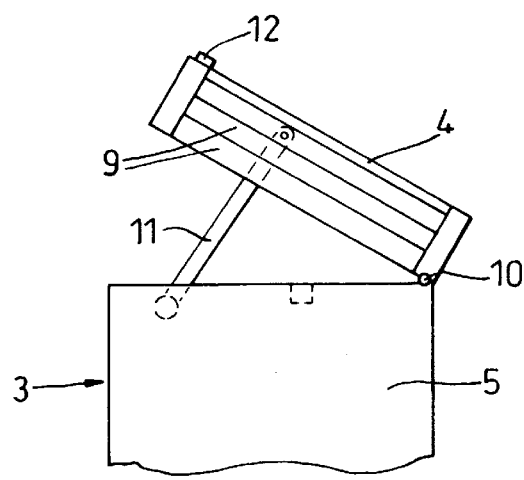
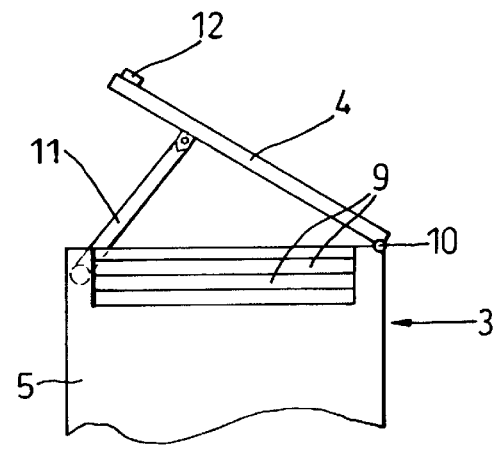
Fig. 6          Fig. 7

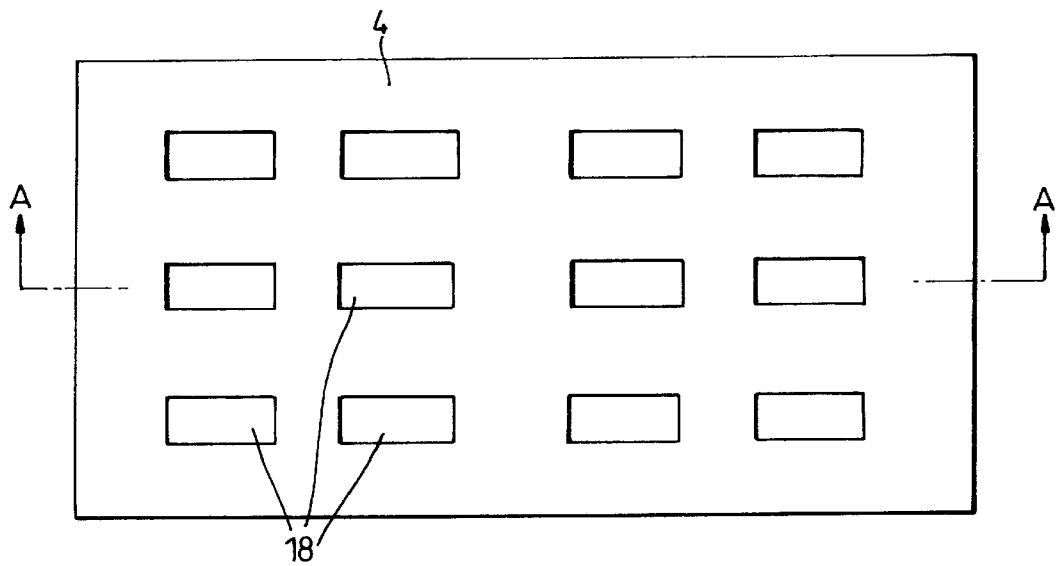
Fig. 10
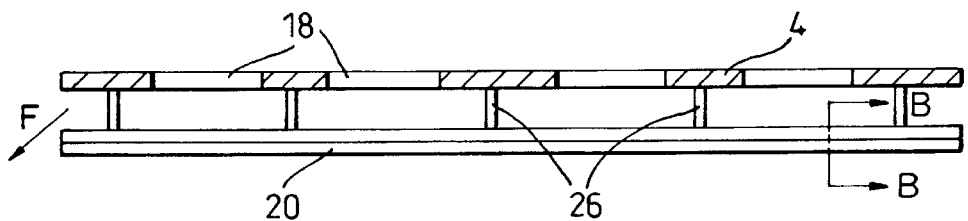
Fig. 11
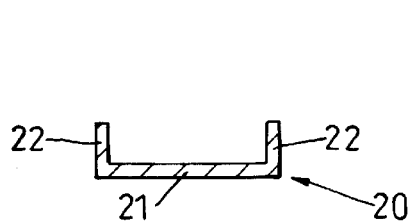 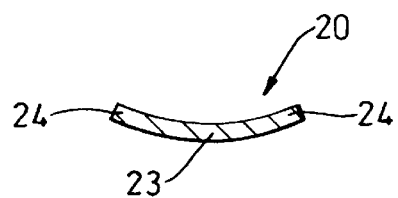
Fig. 12     Fig. 13

BATTERY CONTAINER

This invention relates to a battery container.

When used in certain circumstances, for example as the power source for a vehicle, lead acid batteries are located in containers to provide protection against objects such as tools being dropped on to the terminals or connectors (thereby causing an electrical short or a spark) or against material such as water in the form of a spray or jet. The battery container according to the present invention is intended to meet the requirements of the degree of protection regulations IP 23 according to IEC Publication No. 529 (1989-11).

However, when in use, and therefore discharging, lead acid batteries emit hydrogen gas. When this hydrogen is mixed with oxygen present in the air, and the amount exceeds 4% by volume, there is danger of a fire or explosion. In order to eliminate these dangers, especially if the vehicle is used in an environment such as in a mine where other flammable or explosive gases are likely to be present, the containers have to be well ventilated. To allow a safety margin, containers are constructed to ensure that the amount of hydrogen in the air immediately adjacent the batteries is less than 2%, thus meeting the requirements of BSEN 50014 and BSEN 50019.

Previously known containers, constructed to meet the above-mentioned regulations, have comprised rectangular boxes made of sheet steel eg 3 mm thick. The tops of these boxes are unbroken, i.e. devoid of any aperture, and vents in the form of elongated rectangular openings have been provided at the top of each side immediately below the lid. Sometimes for convenience part of each side has been attached to the lid and the vents located in these parts.

However it has been found that when using the previously known containers the height of the lid above the battery terminals, required to ensure that the vents have sufficiently large cross-sectional area, is a disadvantage since the vehicles to which these containers and batteries are fitted have to be modified. For example a fork-lift truck used in a factory environment where the aforementioned regulations do not apply can be fitted with batteries without the need for containers as described above. If the same truck is used in a mine, or a Zone 1 area, according to European IEC classification, where explosive or flammable gases or vapours occur and where the regulations do apply, then the batteries must be in containers and the fork-lift trucks have to be modified. Since the driver's seat is usually above the space reserved for the batteries, the modification is extensive and therefore expensive.

It is an object of the present invention to provide a battery container which substantially overcomes the effect of the above disadvantages.

In accordance with the invention a container for at least one battery comprises a box having a rectangular base, four vertical rectangular sides and a rectangular lid, each side comprising a ventilation opening, the total open area of the openings measured in a vertical plane parallel to the respective side being at least 1320 mm$^2$ per kilowatt hour of the total capacity of the battery within the container, each opening having a maximum width of 12 mm, and the lid comprising a plurality of apertures and at least one drainage channel having upwardly-directed edges beneath the apertures, the vertical distance between each edge and the lid being a maximum of 12 mm, and the total open area, measured vertically between the edges and the lid, being at least 850 mm$^2$ per kilowatt hour of the total capacity of the battery within the container.

The total area of the ventilation openings in the sides and of the apertures in the lid meets the requirements of BSEN 50014 and BSEN 50019 since it is found that the percentage by volume of hydrogen gas within the space immediately above the battery in the container in accordance with the invention is less than 2% and of the order of 1.6%.

The ventilation openings, either in part of the sides attached to the lid or in the sides themselves, meet the degree of protection regulations IP 23 according to IEC publication No. 529 (1989-11). Preferably at least one louvre is provided defining a boundary of an opening, the louvre being tilted so that any water landing on the upper surface thereof flows away to the exterior of the container.

The lid is preferably formed with a plurality of apertures, eg rectangular in shape, arranged in rows in a rectangular matrix. Supported below each row of apertures, by support means such as rods, is the drainage channel having upwardly directed edges. The channel may be of any suitable cross-sectional form having at least one end positioned either above a louvre or at any other suitable position to ensure that water in the channel flows away to the exterior of the container. Preferably the channel has a small slope from one end to the other and the lower end directs any water to the exterior of the container. The position of the channel in relation to the apertures in the lids meet the requirements of the degree of protection regulations referred to above.

The invention will now be described by way of example only with reference to and as illustrated in the accompanying drawings.

BRIEF DESCRIPTION OF THE DRAWINGS

FIG. 4 shows a side view of a container comprising a crate and a lid, ventilation openings between louvres being provided on a side of the lid;

FIG. 5 shows a side view of a crate and a lid, ventilation openings between louvres being on a side of the crate;

FIG. 6 shows a partial side view of the container showing FIG. 4 with a hinged lid;

FIG. 7 shows a partial side view of the container shown in FIG. 5 with a hinged lid;

FIG. 10 shows a plan view of the lid of a container according to the invention;

FIG. 11 shows a cross-section on line A—A of FIG. 10; and

FIGS. 12 and 13 show two examples of channels, being cross-sections on line B—B of FIG. 11.

Figure 1:
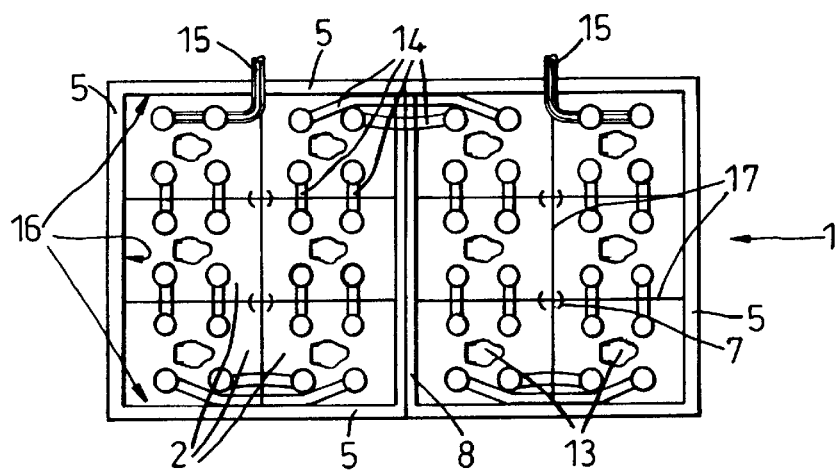
FIGS. 1 to 3 show plan views of three typical battery layouts, each within a crate.

In accordance with the invention a container 1 for a plurality of vehicle drive batteries 2 comprises a box consisting of a crate 3 and a lid 4. The crate comprises four sides 5 and a base 6, each of sheet steel at least 3 mm thick. Drainage holes 7 are provided in the base 6. Partitions 8 of sheet steel are also provided and as shown may comprise two sheets. The height of the partitions is lower than the sides, the tops of the partitions being level with or slightly below the top surfaces of the batteries. The lid 4 also comprises sheet steel at least 3 mm thick.

Figure 8:
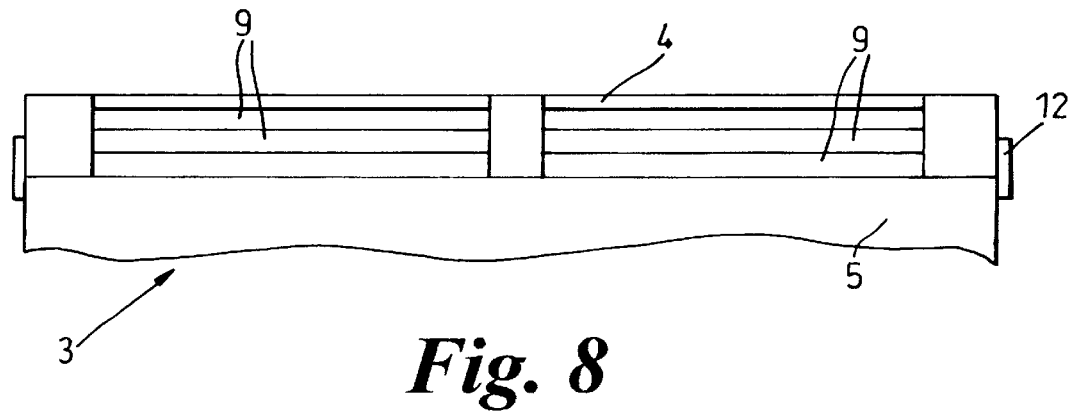
FIG. 8 shows a partial view of an alternative arrangement of openings.

Ventilation openings 9 are provided, either formed in part of the sides attached to the lid 4 as shown in FIGS. 4 and 6 or formed in the upper parts of the sides 5 of the crates 3 as shown in FIGS. 5, 7 and 8. The lid 4 may either be capable of being lifted off completely or attached by means of a hinge 10 as shown in FIGS. 6 and 7. Suitable stays 11 may be provided for the hinged lids as shown in FIGS. 6 and 7 and lockable clasps 12 or the like may be provided for either type of lid.

Figure 2:
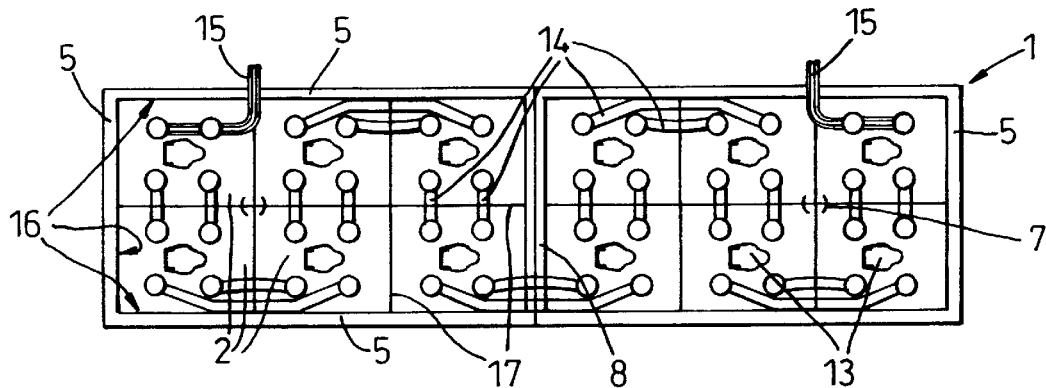
Figure 3:
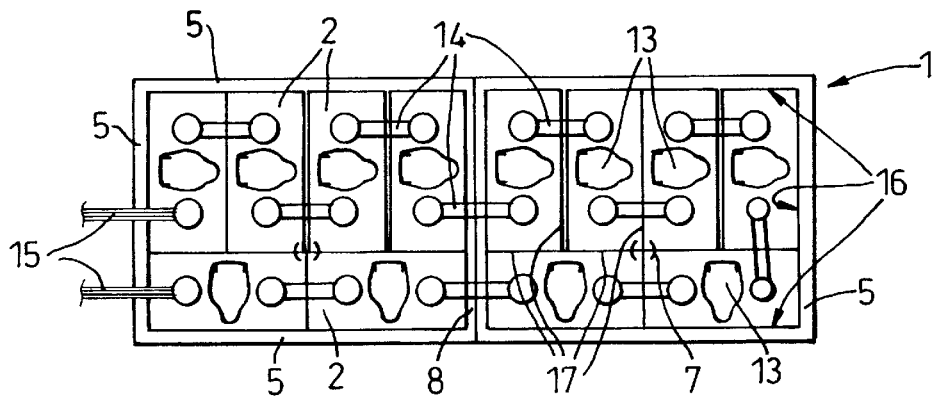

The batteries 2 each having pressure relieving vents 13 within the containers 1 may be arranged in several different layouts, depending on the number and dimensions of the batteries. Three typical layouts are shown in FIGS. 1 to 3, other layouts being possible. Those shown in FIGS. 1 and 2 are for single or double pole batteries (double pole batteries being illustrated) whilst that shown in FIG. 3 is for single pole batteries. Connectors 14 are provided to suit the particular layout. The sizes of the crates and the lids therefore depend on the layouts and so too do the positions of the cables 15 connecting the batteries to the motor of the vehicle being driven, the cables 15 passing through a side 5 to the outside of the container through apertures having grommets provided therein.

All three crates shown in FIGS. 1 to 3 have internal partitions 8, the height of the partition being approximately level with but no higher than the tops of the batteries contained within the container. The crates 3 are lined with insulating sheet material 16, and similar sheet material 17 is located between the individual batteries.

In use the batteries emit hydrogen gas, which, when mixed with the oxygen in the atmosphere, forms an explosive mixture if the proportion by volume of hydrogen is greater than 4%. In order to prevent an explosion, the containers are ventilated by means of the ventilation openings 9 referred to above and by means of apertures 18 formed in the lid 4.

Figure 9:
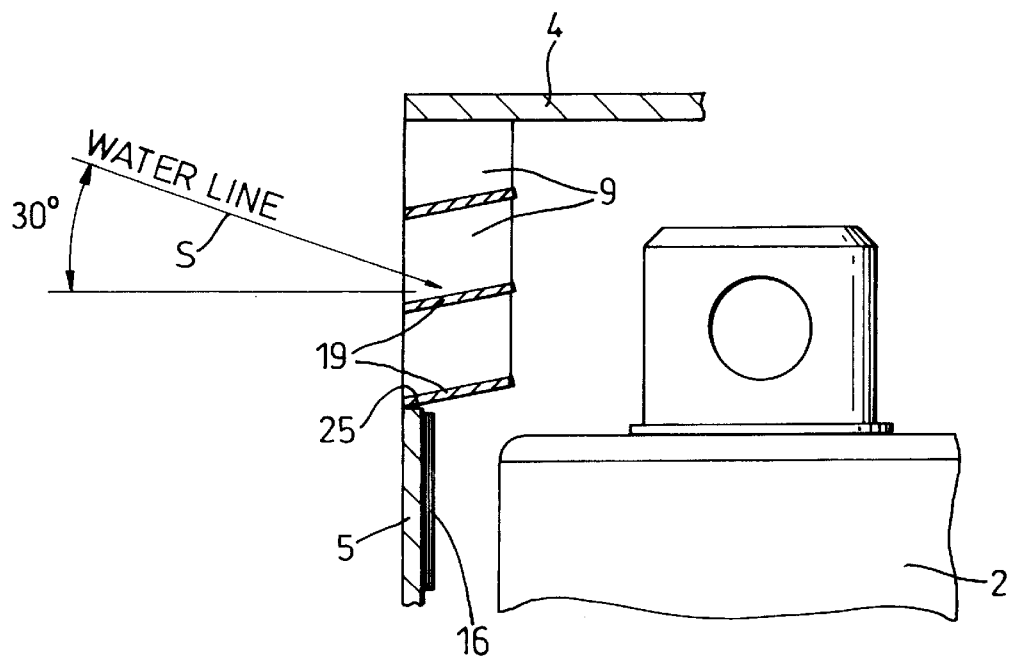
FIG. 9 shows an enlarged cross-sectional detail of the openings of a container according to the invention.

As can be seen particularly in FIG. 9, the openings are provided between adjacent louvres 19 and between a louvre and the lid 4. In an alternative construction (not shown) an opening may be provided between the top edge 25 of the side 5 and the lowest louvre 19. The maximum vertical height of an opening is 12 mm. This is in accordance with the requirements of IP 23 IEC 529 (1989-11) and is intended to prevent a person pushing one of their fingers through the opening. Further, the louvres are tilted so as to slope from the inside of the container downwards towards the outside, thus preventing most of the water in a spray at an angle of up to 30° from the horizontal (as shown by line S) from entering the container and thus meeting the requirements of the regulations referred to above.

The openings are constructed and arranged so that the total open area, measured vertically, is at least 1320 mm$^2$ per kilowatt hour of the capacity of the batteries within the container. The openings 9 may be arranged as one array per side as shown in FIGS. 4 to 7, two arrays per side as shown in FIG. 8, or for very large containers, 3 arrays per side.

For example, as shown in FIG. 8 the total vertical open distance of the spaces between the louvres etc is 36 mm and the total array length of the openings (around all sides) is such that the total open area is 1320 mm$^2$ per kilowatt hour. For example for a container containing 40 batteries ie 80 volts, with a capacity of 860 ampere hours (68.8 kilowatt hours), the total horizontal length around all four sides is 2523 mm and the vertical distance is 36 mm, so the total open area is 90,828 mm$^2$ equal to 1320 mm$^2$ per kilowatt hour.

The apertures 18 in the lids are generally rectangular (but may be of other shapes, eg circular) arranged in rows. Under each row is a channel 20 to catch any water falling through the apertures 18 and to lead it to an opening 9 where it falls out of the container as indicated by the arrow F in FIG. 11.

The channels 20, made of sheet steel, may be of any suitable shape; two examples are shown in FIGS. 12 and 13. The first example shown in FIG. 12 comprises a narrow base strip 21 with two upwardly-directed edge portions 22, the edge portions being perpendicular to the strip. The channel slopes to ensure that any water collected flows away through a ventilation opening. The edge portions may be formed by bending the sides of the strip or welding separate smaller strips to the side of the base strip. The second example, shown in FIG. 13, comprises a strip 23 with a curved cross-section, the edges 24 of the strip extending upwardly. Again the whole strip slopes so as to ensure water flows away. Both examples of channels are supported below a row of apertures by means of short rods 26 (see FIG. 10) secured to the underside of the lid 4. The upper extremities of the edge portions 22 of the first example or of the edges 24 of the second example are a maximum of 12 mm below the underside of the lid 4. The channels 20 have a width of 70 mm, i e greater than the width of the aperture which may for example have a width of 25 mm, in order to meet the requirements of IP23 IEC 529 (1989-11).

In one example the lid has twelve apertures 18 each having a size of 195 mm×25 mm to ensure that the total open area, measured vertically, that is total area=12 mm (vertical spacing)×205 mm (length)×2 (2 sides to the aperture)×12 (the number of apertures) is greater than 850 mm$^2$ per kilowatt hour of battery capacity. Thus for a container containing 40 batteries i e 80 volts, with a capacity of 860 ampere hour (68.8 kilowatt hour), the total area of the apertures is 58,480 mm$^2$ i e equal to 858 mm$^2$ per kilowatt hour, which is greater than the minimum value of 850 mm$^2$ per kilowatt hour referred to above In use when the batteries are discharging hydrogen gas is emitted and, being less dense than air, rises through the apertures and the upper parts of the openings taking some air with it. Air from outside the container thus flows into the lower parts of the openings.

Because of the provision of apertures 18 in the lid 4, the overall height of the openings is substantially less than hitherto. For example the height for a container for 40 batteries is 58 mm less than a container having no ventilation apertures in the lid. The container of the invention can therefore be fitted to conventional fork lift trucks (or similar vehicles) with little or no need for adaptation or modification.

What we claim is:

1. A container for at least one battery comprising a box having a rectangular base, four vertical rectangular sides and a rectangular lid, each side comprising at least one ventilation opening, the total open area of the at least one opening measured in a vertical plane parallel to the respective side being at least 1320 mm$^2$ per kilowatt hour of the total capacity of the battery within the container, each of said at least one opening having a maximum width of 12 mm, and the lid comprising a plurality of apertures and at least one drainage channel having upwardly directed edges positioned beneath the apertures and leading fluid entering said apertures to flow out of the container through said at least one opening, the vertical distance between each edge and the lid being a maximum of 12 mm, and the total open area, measured vertically between the edges and the lid, being at least 850 mm$^2$ per kilowatt hour of the total capacity of the battery within the container.

2. The container according to claim 1 wherein the ventilation openings are in the sides.

3. The container according to claim 1 comprising at least one louvre defining a boundary of an opening, the louvre being tilted so that any water landing on an upper surface thereof flows away to the exterior of the container.

4. The container according to claim 1 wherein the lid is formed with a plurality of apertures arranged in rows.

5. The container according to claim 4 wherein the apertures are arranged in rows in a rectangular matrix.

6. The container according to claim 4 wherein a drainage channel is supported below each row by support means.

7. The container according to claim 6 wherein the support means comprises a plurality of rods.

8. The container according to claim 1 wherein the channel has at least one end positioned to ensure that water in the channel flows away to the exterior of the container.

9. The container according to claim 8 wherein the channel has a small slope from one end to the other and a lower one of said ends directs any water to the exterior of the container.

10. A lid for a battery container, comprising a horizontally-disposed top panel and a side panel extending downwardly therefrom, at least one ventilation opening being located in said side panel, a plurality of apertures in the top panel, and at least one drainage channel having upwardly directed edges positioned beneath the apertures and extending to said ventilation opening such that fluid entering said apertures flows to and drains from said ventilation opening.

11. The lid according to claim 10, further comprising a louvre defining a boundary of the ventilation opening.

12. The lid according to claim 10, wherein the drainage channel is sloped.

13. The lid according to claim 10, wherein the lid comprises a plurality of side panels.

14. A container for at least one battery, comprising a box having a base, a vertical side wall and a lid, the side wall including a ventilation opening, and the lid including a plurality of apertures and at least one drainage channel having upwardly directed edges positioned beneath the apertures and extending to said ventilation opening such that fluid entering said apertures flows to and drains from said ventilation opening.

15. The container according to claim 14, further comprising a louvre defining a boundary of the ventilation opening.

16. The container according to claim 14, wherein the drainage channel is sloped.

17. The container according to claim 14, wherein the box comprises a plurality of side walls.

18. A lid for a battery container, comprising:

a panel having a plurality of apertures; and a channel positioned beneath the apertures and structured and arranged to catch fluid falling through the apertures and lead the fluid out of the container through a ventilation opening in the side thereof.

19. The lid according to claim 18, further comprising a louvre defining a boundary of the ventilation opening.

20. The lid according to claim 18, wherein the drainage channel is sloped.

21. The lid according to claim 18, wherein the lid comprises a plurality of side panels.

* * * * *